United States Patent [19]

Richter et al.

[11] 4,338,049

[45] Jul. 6, 1982

[54] HIGH PRESSURE FEEDER PIVOTAL CENTER SCREEN

[75] Inventors: Johan C. F. C. Richter, Nice, France; Michael I. Sherman, Glens Falls, N.Y.

[73] Assignee: Kamyr, Inc., Glenn Falls, N.Y.

[21] Appl. No.: 205,518

[22] Filed: Nov. 10, 1980

[51] Int. Cl.³ .................. B65G 53/30; B65G 53/46
[52] U.S. Cl. ................................. 406/63; 210/354; 210/391; 406/105
[58] Field of Search ............... 406/63, 105, 171, 172; 210/328, 354, 355, 391

[56] References Cited

U.S. PATENT DOCUMENTS 4,082,368 4/1978 Funk .

FOREIGN PATENT DOCUMENTS 128264 5/1980 Sweden .

OTHER PUBLICATIONS

"Kamyr Bulletin No. 8", Edited by Kamyr AB, Apr., 1949.

Primary Examiner—Jeffrey V. Nase
Attorney, Agent, or Firm—Cushman, Darby & Cushman

[57] ABSTRACT

A high pressure transfer device and a method of continuously conveying a liquid suspension of particulate material utilizing the transfer device are provided. The device includes a pocketed rotor rotatable in a housing, with a center screen mounted in each rotor. The screen is mounted within each pocket interior so that as liquid under pressure enters the pocket through its inlet the screen will move to enlarge the volume between the inlet and the screen. This is accomplished by forming each screen as two screen portions and mounting the screen portions for pivotal movement with respect to a center post extending in the pocket coextensive with the rotor axis of rotation. Stops are provided extending from the pocket walls to prevent the screen portions for pivoting into alignment with the pocket inlet or outlet, and each pocket preferably has a substantially circular cross-sectional internal configuration. The rotor portions are constructed so that they may be machined, allowing accurate and relatively inexpensive construction thereof.

17 Claims, 5 Drawing Figures

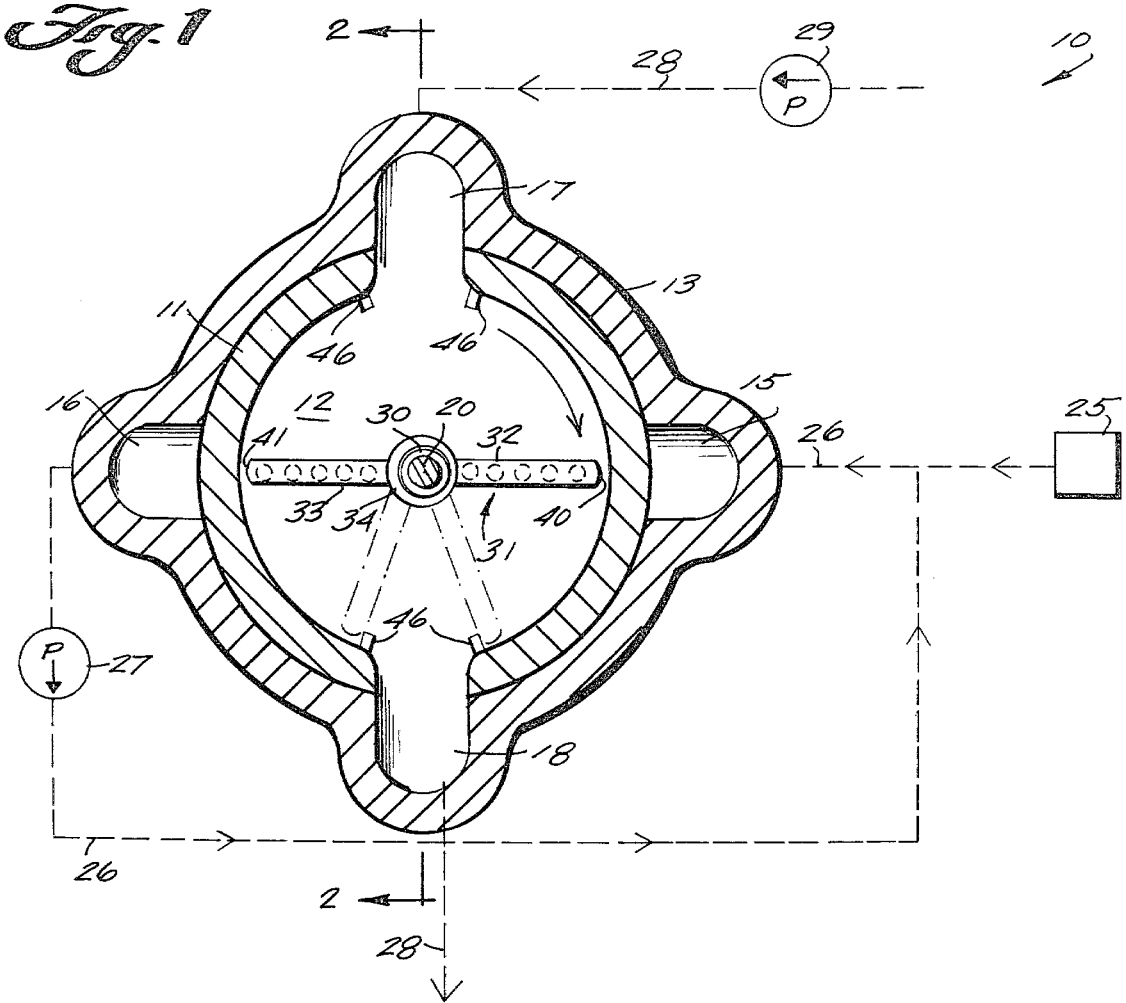
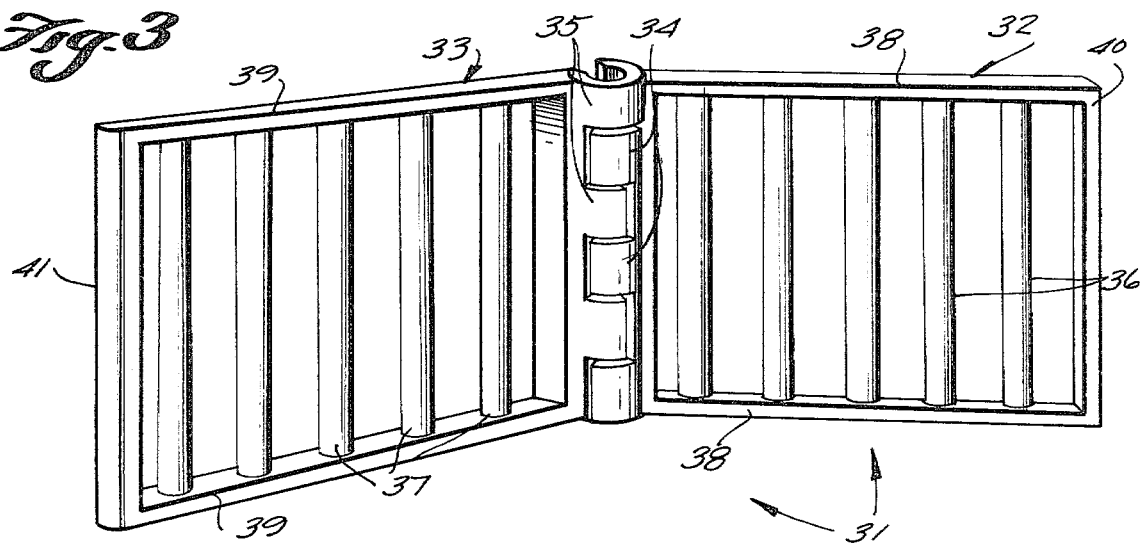

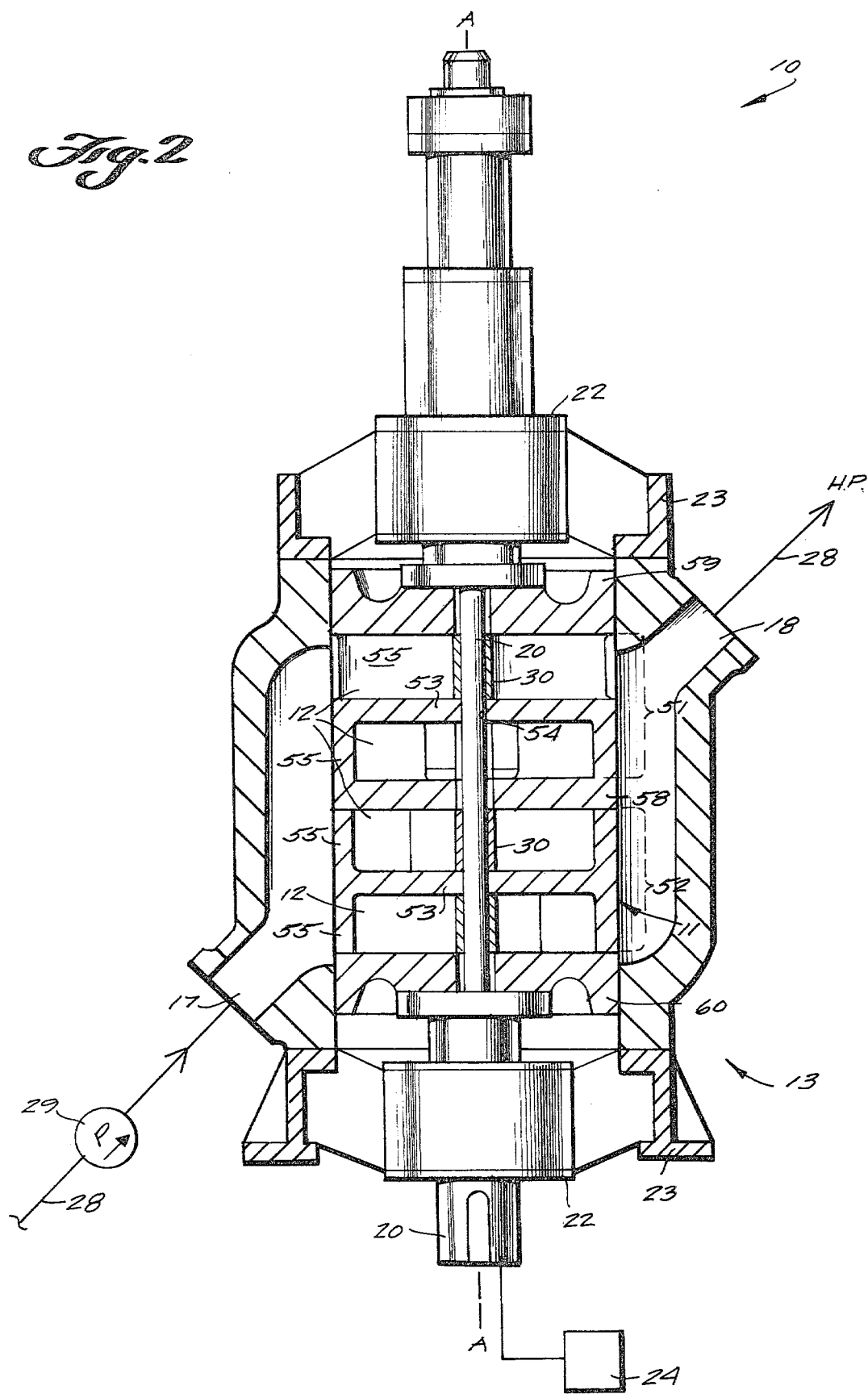

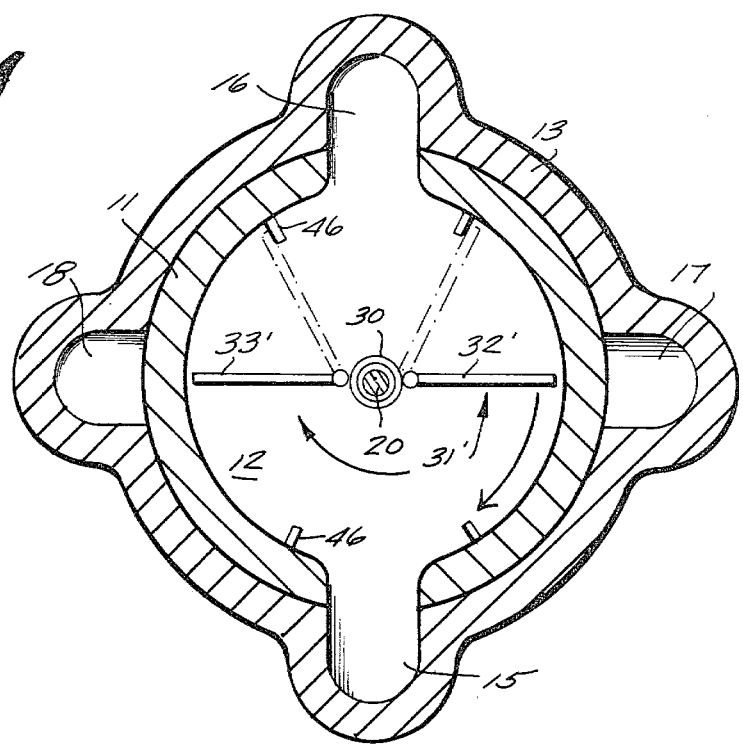
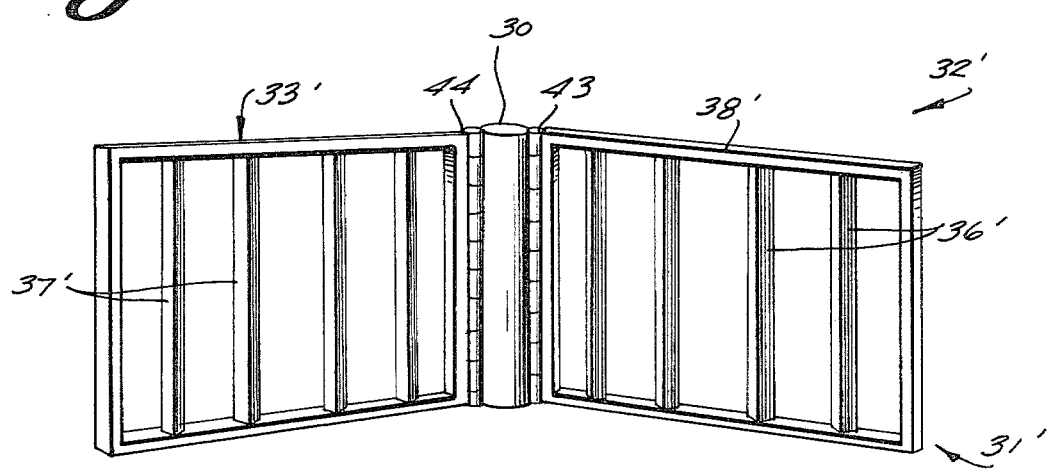

HIGH PRESSURE FEEDER PIVOTAL CENTER SCREEN

BACKGROUND AND SUMMARY OF THE INVENTION

Conventional high pressure transfer devices, such as shown in U.S. Pat. No. 4,082,368 (the disclosure of which is hereby incorporated by reference herein) provide for the effective high pressure feeding of a variety of liquid suspensions of particulate material, such as a slurry of wood chips, or a slurry of coal. While such structures are normally successful in performing their intended function, under some circumstances problems of clogging or excessively great wear of the housing-mounted screen associated with the device occur. It has been proposed (see Swedish Pat. No. 128,264 and copending application Ser. No. 123,947 filed Feb. 28, 1980) to mount the transfer device screen in the center of a pocket rather than in the rotor housing. While such a mounting of the screen avoids problems associated with the housing-mounted screen, it effectively reduces the volume of each pocket in half, minimizing the capacity of the transfer device.

According to the present invention, a high pressure transfer device and a method of conveying a liquid suspension of particulate material utilizing the transfer device are provided which have the aforementioned advantages associated with a center mounted screen, and minimize the above-mentioned disadvantage associated with such a screen.

The high pressure transfer device according to the present invention includes the conventional components of a pocketed rotor containing a pair of diametrically through-going pockets perpendicular to each other and rotatable about an axis, with a housing enclosing the rotor. The housing has four ports spaced around the periphery thereof for registry with inlets to and outlets from the through-going pockets. Means are provided for rotating the rotor in the housing with respect to the ports in a given direction of rotation, and a screen is disposed interiorly of each of the through-extending pockets between the inlet and outlet of each pocket. According to the invention, means are provided for mounting the screen within each pocket interior so that as liquid under pressure enters the pocket through the inlet thereof the screen will move to enlarge the volume between the inlet and the screen.

According to the invention, preferably the screen is formed as first and second screen portions, and a center component is disposed in each pocket (such as a center post coextensive with the axis of rotation of the rotor). The means for mounting the screen within the pocket comprises means for mounting each of the screen components with respect to the center component so that they are pivotal about an axis generally parallel to, or coextensive with, the rotor axis of rotation. Stop means are also provided for limiting the amount of pivotal movement of each screen portion of each screen about their axes so that the screen portions are never aligned with the pocket inlet or outlet. Thus each screen continues to effectively perform its screening function while providing an effective pocket volume almost as great as the pocket volume without a screen.

According to the method of the invention, a liquid suspension of particulate material may be continuously conveyed utilizing a high pressure transfer device as previously described. The liquid suspension that is conveyed may be a slurry of cellulosic particulate material suitable for the formation of paper pulp, or may be a slurry of hard particulate material, the particles having non-uniform and irregular shapes. Typical hard particulate materials that may be conveyed include undersea nodules (e.g. manganese nodules), coal, or rocks.

The method according to the invention comprises the following steps: (a) Continuously feeding liquid containing particulate material into a first of the housing ports for entry into a through-going pocket of the rotor. (b) Rotating the rotor in a given direction of rotation, so that it progressively rotates past each of the housing ports. (c) Providing withdrawal of liquid introduced through the first port from through-going pockets of the rotor through a third port of the housing, opposite the first port, and screening the particulate material above a predetermined size out of the liquid passing through the third port with the screen. (d) Pumping liquid under high pressure toward the rotor through a fourth port of the housing, the fourth port being located before the first port in the direction of rotation of the rotor, and between the first and third ports. (e) Providing withdrawal of liquid introduced through the fourth port, and entrained particulate material, through a second port located opposite the fourth port. And, (f) effecting adjustment of the volume of a pocket between the inlet to the pocket and the screen during introduction of liquid with entrained particulate material in step (a) to maximum effective pocket volume while not adversely affecting particulate material screening of step (c).

When constructing the rotor for the high pressure device according to the present invention, in view of the particular nature of the through-going pockets and the necessity for mounting the screens within the pockets, the rotor may be constructed in halves of solid material, with the pockets machined out of the halves. A metal plate is disposed between the rotor halves after insertion of the screens into the pockets, and end plates are disposed on the ends of the rotor, with the shaft for rotating the rotor extending through the interior of all the rotor components. The axis of rotation of the rotor may be horizontal or vertical, depending upon the particular use.

The invention also contemplates a rotor with particular center mounted screens for use in the high pressure transfer device.

It is the primary object of the present invention to provide a high pressure transfer device with a pocketed rotor having a center mounted screen which minimally restricts the effective volume of the rotor pockets, and a method of utilization of such a device for conveying a liquid suspension of particulate material. This and other objects of the invention will become clear from an inspection of the detailed description of the invention, and from the appended claims.

BRIEF DESCRIPTION OF THE DRAWINGS

FIG. 1 is an end view, partly in cross-section and partly in elevation, of an exemplary high pressure transfer device according to the invention with a center mounted screen;

FIG. 2 is a side view, partly in cross-section and partly in elevation, of the high pressure transfer device taken along lines 2—2 of FIG. 1;

FIG. 3 is a perspective detail view of the exemplary center mounted screen utilized in the transfer device of FIG. 1;

FIG. 4 is a view like FIG. 1 only showing an alternative construction of the center mounted screen; and FIG. 5 is a detail perspective view of the exemplary center mounted screen utilized in the transfer device of FIG. 4.

DETAILED DESCRIPTION OF THE DRAWINGS

An exemplary high pressure transfer device according to the present invention is shown generally at 10 in FIGS. 1, 2, and 4. The device includes the conventional high pressure transfer device components of a pocketed rotor 11 containing a pair of diametrically through-going pockets 12 perpendicular to each other (two rows of diametrically through-going pockets are illustrated in the embodiment in the drawings, the two rows of pockets being parallel with one row being 45° displaced peripherally from its adjacent row), and a housing 13 enclosing the rotor. The housing has four ports 15 through 18 equally spaced around the exterior periphery thereof for registry with inlets to and outlets from the pockets 12. The rotor 11 is mounted for rotation about an axis A—A by a shaft 20, which may be journalled in bearings 22 at either end of the housing 13, operatively connected to the housing 13 by brackets 23 or the like (see FIG. 2). A conventional power drive 24 is provided as a means for rotating the shaft 20, and the rotor 11 operatively connected thereto, in a given direction of rotation.

In operation of the device 10, liquid with entrained particulate material (such as manganese nodules entrained in liquid at the ocean floor, wood chips, coal, or rocks) is pumped from source 25 through low pressure line 26 to a first port 15 of the housing 13. The low pressure line 26 continues from a third port 16 on the opposite side of the housing 13 as the first port 15, with the low pressure pumping pressure being provided by pump 27 (see FIG. 1). The high pressure fluid transfer path of the device 10 includes the line 28 which enters a fourth port 17 of the housing 13, and is withdrawn through a second port 18 of the housing 13, opposite the fourth port 17. A high pressure pump 29 provides the motive force for the liquid in the line 28.

The device 10 further includes screen means for screening particulate material above a predetermined size out of the liquid passing through at least one of the ports 15 through 18. The screen means take the form of an interiorally mounted screen 31, 31' which may be associated with a central component (post) 30 disposed within each pocket 12, the central posts 30 providing additional support to maintain the integrity of the rotor 11 when they are utilized with the shaft 20 passing through posts 30. As indicated in the drawings, preferably the pockets 12 are straight (extend straight through the rotor 11), and are widened at an interior portion thereof, and are circular in cross-section.

During operation of the device 10, the particulate material entrained in the liquid passing from line 26 into port 15 is screened out by the screen 31 in each of the pockets 12, while the liquid passes through the screens 31 and subsequently to outlet port 16. High pressure liquid supplied to inlet 17 flushes the particulate material out of the pockets 12 as the pockets are rotated into operative communication with port 17, the particulate material being entrained in the liquid as it exits outlet port 18 and is subsequently conveyed through line 28 to an ultimate destination.

In order to insure that maximum pocket volume is provided for each of the pockets 12 of the rotor 11, while not interfering with the screening function of the screens 31, 31', according to the present invention means are provided for mounting each screen within each pocket interior so that as liquid under pressure enters the pocket through the inlet thereof the screen 31, 31' will move to enlarge the volume between the inlet and the screen. In the exemplary embodiments illustrated in the drawings (see FIGS. 1, 3, 4 and 5; the screens have been removed for clarity of illustration in FIG. 2) the screens are formed of first and second screen portions. For instance screen 31 is formed of the first screen portion 32 and second screen portion 33, while screen 31' is formed of first screen portion 32' and second portion 33'. The movable mounting of the screen is provided by means for mounting each of the screen portions 32, 33 (or 32', 33') with respect to the center post 30 so that they are pivotal about an axis generally parallel to or coextensive with the axis of rotation A—A of the rotor 11.

In the embodiment of the invention illustrated in FIGS. 1 and 3, the means for mounting the screen portions 32, 33 for pivotal movement comprise a first discontinuous collar 34 formed on one side of the first screen portion 32, and a second discontinuous collar 35 formed on one side of the second screen portion 33. The collars 34, 35 are dimensioned to surround the center post 30 and to intermesh (as illustrated in FIG. 3) when disposed surrounding the center post 30. The screen portions 32, 33 may be constructed in any manner that provides for effective screening of the particular particulate material with which they are dealing. For instance, when the screens are to be utilized for screening hard particulate material, a plurality of elongated bars 36, 37 are mounted by transverse frame components, 38, 39 respectively for the first and second screen portions 32, 33 respectively. The bars 36, 37 may be circular in cross-section, or may be square in cross-section, and mounted by the transverse frame components so that they present a diamond configuration to fluid flowing therethrough. The screen 31 is mounted so that the distal portions 40, 41 of the screen portions 32, 33 respectively are slightly spaced from the interior periphery of the rotor 11 forming the pockets 12, as indicated in FIG. 1.

The screen 31' is substantially identical to the screen 31 except for the exact manner in which it is mounted for pivotal movement. As illustrated in FIGS. 4 and 5, screen portion 32' is mounted at one end thereof to the post 30 by a conventional hinge 43, while screen portion 33' is mounted to post 30 by hinge 44. The hinges 43, 44 may be of any suitable type, such as conventional door hinges, a strip of flexible material, or the like.

In order to insure effective operation of the screens 31, 31' to perform their screening function even though they are movable to maximize the effective volume of the pockets 12, stop means are provided associated with each pocket 12 for limiting the amount of pivotal movement of each of the screen portions about their axes of rotation, so that the screen portions are never aligned with a pocket inlet or outlet. As illustrated in FIGS. 1 and 4, the stop means preferably comprise a pair of flanges 46 extending inwardly from a wall of the rotor defining each pocket, one pair of flanges associated with each pocket inlet and outlet.

A typical operation of the pivotal screen means according to the invention may be gleaned from FIGS. 1 and 4. With respect to FIG. 4, when the rotor 11 has rotated so that a pocket 12 is in operative communication with housing inlet port 15, liquid with entrained particulate material enters the pocket 12 through the inlet 15, the force of the liquid causing the screen portions 32′, 33′ to move to the dotted line position illustrated in FIG. 4, at which position the further movement of the screen portions is arrested by the stop flanges 46. The rotor 11 then rotates so that an inlet to the same pocket 12 is in operative communication with the high pressure liquid inlet port 17 (see FIG. 1). The liquid entering the port 17 flushes the screened particulate material in the pocket 12 (which is on the opposite side of screen 31 as port 17) through outlet 18, at the same time causing the screen portions 32, 33 to move to the dotted line position illustrated in FIG. 1, at which point they are stopped by the stop flanges 46. Since the motive force for effecting pivotal movement of the screen portions is provided by the introduced fluid, the axis A—A of the rotor 11 may be either vertical or horizontal, and the device will still operate properly.

In order to facilitate pivotal mounting of the screen portions 32, 33 or 32′, 33′ within the pocket 12, the rotor 11 may be constructed as illustrated in FIG. 2. The rotor comprises a first rotor half 51 and a second rotor half 52, being disposed on opposite sides of a plane perpendicular to the axis of rotation A—A of the rotor and bisecting the rotor. Each half 51, 52 comprises a central base portion 53 with means defining a central bore 54 therein, the bore 54 being coextensive with the axis or rotation of the rotor. Each base portion 53 is circular in shape with circumferentially disposed axially extending walls 55 being formed integrally therewith, and extending axially from each face thereof. Also, the central posts 30 associated with the pockets 12 may be formed integrally with base portion 53, extending axially from either face thereof, or the posts 30 may be separable sleeves.

Each of the walls 55 on each side of each central base portion 53 have means defining a pair of openings therein, those openings corresponding to the pocket 12 inlets and outlets. The volume between the walls 55 and the base portion 53 on each side of the base portion 53 defines the volume of a pocket 21. The rotor halves 51, 52 may be formed by casting a single piece of metal and machining the pocket 12 out, leaving base portion 53 and the circumferential walls 55 (and perhaps the central posts 30).

The rotor 11 further comprises a middle plate 58 disposed between the rotor halves 51, 52 along the axis of rotation A—A, and defines with the rotor halves 51, 52 the volume of the two middle pockets 12 of the rotor 11. The rotor 11 further comprises a first end plate 59 parallel to middle plate 58 and on the opposite side thereof as the first rotor half 51, and a second end plate 60 disposed parallel to middle plate 58 and on the opposite side thereof as the second rotor half 52. In constructing the rotor 11, after formation of the pocket halves 51, 52, the screens 31 (or 31′) may be readily mounted within each pocket 12. After the screens are mounted within each pocket 12, the middle plate 58 is disposed between the rotor halves 51, 52, and the end plates 59, 60 are assembled on the ends of the halves 51, 52. The various rotor components may be attached together by any suitable means. For instance, they may be welded together, or they may be compressed together during use by a thrust provided from bearings 22. The central shaft 20 is introduced through the bores 54, and corresponding openings formed in the center posts 30 and plates 58, 59, and 60, and the shaft 20 may be keyed to all of the rotor components, or just to some of the rotor components if they are otherwise attached together. Any manner of attachment of the rotor 11 components together and to the shaft 20 that allows the rotor to function in the high pressure transfer device 10 according to the present invention is appropriate.

It will thus be seen that according to the present invention a high pressure transfer device (and a particular rotor for the high pressure transfer device, with center mounted screen) has been provided, as well as a method of utilization thereof for conveying liquid suspensions of particulate material, that minimize the reduction of pocket volume associated with a pocket interior-mounted screen. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A high pressure transfer device including a pocketed rotor containing a pair of diametrically through-going pockets perpendicular to each other and rotatable about an axis; a housing enclosing said rotor, said housing having four ports spaced around the periphery thereof for regisry with inlets to and outlets from said through-going pockets; means for rotating said rotor in said housing with respect to said ports in a given direction of rotation; and a screen disposed interiorly of each of the through-extending pockets between the inlet and outlet of each pocket; and
   means for mounting said screen within each said pocket interior so that as liquid under pressure enters said pocket through the inlet thereof the screen will move to enlarge the volume between the inlet and the screen.

2. A device as recited in claim 1 wherein each said screen comprises first and second screen portions, and wherein said means for mounting each screen comprises a center component disposed in each pocket, and means for mounting each of said screen portions with respect to said center component so that they are pivotal about an axis generally parallel to or coextensive with said axis of rotation of said rotor; and further comprising stop means for limiting the amount of pivotal movement of each of said screen portions about said axis so that said screen portions are never aligned with each said pocket inlet or outlet.

3. A device as recited in claim 2 wherein said stop means comprises a pair of flanges extending inwardly from a wall of said rotor defining each said pocket associated with each said pocket inlet and outlet, one flange of each pair disposed on one side of said pocket inlet or outlet, and one flange of each pair disposed on the other side of said pocket inlet or outlet.

4. A device as recited in claim 2 wherein each pocket has a substantially circular cross-sectional internal configuration.

5. A device as recited in claim 2 wherein said center component comprises a center post located approximately at the center of each of said pockets, and extending substantially coextensively with said axis of rotation of said rotor.

6. A device as recited in claim 5 wherein said means for mounting each of said screen portions so that they are pivotal about an axis generally parallel to or coextensive with said rotor axis of rotation comprises: a first hinge mounting said first screen portion to a first side portion, with respect to said pocket inlet and outlet, of said center post; and a second hinge mounting said second screen portion to a second side portion of said center post, opposite said first side portion.

7. A device as recited in claim 5 wherein said means for mounting each of said screen portions so that they are pivotal about an axis generally parallel to or coextensive with said rotor axis of rotation comprises: a first discontinuous collar formed on one side of said first screen portion, and a second discontinuous collar formed on one side of said second screen portion; said first and second discontinuous collars dimensioned to surround said center post, and intermeshing when disposed surrounding said center post.

8. A device as recited in claims 6 or 7 wherein each of said pockets is substantially wider at a middle portion thereof than at the inlet and outlet therefor, and has a substantially circular cross-sectional internal configuration.

9. A device as recited in claim 2 wherein said rotor contains two rows of diametrically through-going pockets, each row containing two through-going pockets perpendicular to each other, the two rows of pockets being parallel, with one row being 45° displaced peripherally from its adjacent row.

10. A device as recited in claim 9 wherein said rotor comprises two rotor halves, a first half being disposed on one side of a plane perpendicular to the axis of rotation of said rotor and bisecting said rotor, and a second half being disposed on the opposite side of said plane; each half comprising a central portion with means defining a central bore therein coextensive with the axis of rotation of said rotor, said base portion being circular in shape, with circumferentially disposed axially extending walls being formed integrally with said central base portion, and means defining a pair of openings in each of said walls on each side of said central base portion, so that the volume between said walls and said base portion on each side of said base portion defines the volume of a said pocket, and the openings in said walls define the inlet and outlet to each pocket; and wherein said rotor further comprises a middle plate disposed between said first and second rotor halves disposed in a plane perpendicular to the axis of rotation of said rotor and defines with said rotor halves the volume of two of said pockets; a first end plate disposed parallel to said middle plate and on the opposite side thereof as said first rotor half; a second end plate disposed parallel to said middle plate and on the opposite side thereof as said second rotor half; and means for holding said end plates, middle plates, and rotor halves together with a rotor shaft disposed centrally thereof and extending through said rotor halves base portions, and through central openings in said middle plate and said end plates.

11. A method of continuously conveying a liquid suspension of particulate material, utilizing a high pressure transfer device including a pocketed rotor containing a pair of diametrically through-going pockets perpendicular to each other, a housing enclosing the rotor and having four ports spaced around the periphery thereof for registry with inlets and outlets from the through-going pockets in the rotor, and a screen mounted interiorly of each pockets for allowing passage of liquid and particles smaller than a predetermined size therethrough, but preventing passage of particles larger than the predetermined size therethrough; the method comprising the steps of (a) continuously feeding liquid containing the particulate material into a first of the housing ports for entry into a through-going pocket of the rotor;

(b) rotating the rotor in a given direction of rotation, so that it progressively rotates past each of the housing ports;

(c) providing withdrawal of liquid introduced through the first port from through-going pockets of the rotor through a third port of the housing, opposite the first port, and screening the particulate material above a predetermined size out of the liquid passing through the third port with the screen;

(d) pumping liquid under high pressure toward the rotor through a fourth port of the housing, the fourth port being located before the first port in the direction of rotation of the rotor, and between the first and third ports;

(e) providing withdrawal of liquid introduced through the fourth port, and entrained particulate material through a second port, located opposite the fourth port; and (f) effecting adjustment of the volume of a pocket between the inlet to the pocket and the screen during introduction of liquid with entrained particulate material in step (a) to maximize effective pocket volume while not adversely affecting particulate material screening of step (c).

12. A method as recited in claim 11 wherein step (f) is practiced by forming each screen as two screen portions; providing a central post extending in each pocket coextensive with the axis of rotation of the rotor; operatively mounting the screen portions for pivotal movement with respect to the central post; and positively preventing pivoting of the screen portions into alignment with the inlet or outlet of the pocket in which they are mounted.

13. A method as recited in claim 12 wherein the liquid suspension of particulate material comprises a slurry of cellulosic particulate material suitable for the formation of paper pulp.

14. A method as recited in claim 12 wherein the liquid suspension of particulate material comprises a slurry of hard particulate material, the particles having non-uniform and irregular shapes.

15. A rotor having at least one diametrically through-extending pocket having an inlet and an outlet, and adapted to be mounted for rotation about a given axis of rotation, a central post formed in said pocket and extending substantially coextensively with said axis of rotation; a particulate screen, including first and second screen portions, for screening particulate material above a predetermined size out of a liquid flow; means for operatively mounting said screen portions with respect to said central post so that said screen portions are effective to screen particulate material above a predetermined size flowing through said pocket from the inlet through the outlet thereof out of the liquid, and so that said screen portions are pivotal about an axis or axes generally coextensive with or parallel to said rotor axis of rotation; and stop means for limiting the amount of pivotal movement of each of said screen portions about said axis.

16. A rotor as recited in claim 15 wherein said means for mounting each of said screen portions so that they are pivotal about an axis generally parallel to or coextensive with said rotor axis of rotation comprises: a first hinge mounting said first screen portion to a first side portion, with respect to said pocket inlet and outlet, of said center post; and a second hinge mounting said second screen portion to a second side portion of said center post, opposite said first side portion.

17. A rotor as recited in claim 15 wherein said means for mounting each of said screen portions so that they are pivotal about an axis generally parallel to or coextensive with said rotor axis or rotation comprises: a first discontinuous collar formed on one side of said first screen portion, and a second discontinuous collar formed on one side of said second screen portion; said first and second discontinuous collars dimensionsed to surround said center post, and intermeshing when disposed surrounding said center post.

* * * * *